United States Patent
Cheng et al.

(10) Patent No.: US 9,317,167 B2
(45) Date of Patent: Apr. 19, 2016

(54) TOUCH CONTROL SYSTEM AND SIGNAL PROCESSING METHOD THEREOF

(71) Applicant: MStar Semiconductor, Inc., Hsinchu Hsien (TW)

(72) Inventors: Chao-Ting Cheng, Hsinchu County (TW); Meng-Che Tsai, Hsinchu County (TW); Chao-Cheng Wen, Hsinchu County (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 56 days.

(21) Appl. No.: 14/278,341

(22) Filed: May 15, 2014

(65) Prior Publication Data
US 2014/0340355 A1    Nov. 20, 2014

(30) Foreign Application Priority Data

May 16, 2013   (TW) .............................. 102117396 A (51) Int. Cl.
*G06F 3/045* (2006.01)
*G06F 3/044* (2006.01)
*G06F 3/041* (2006.01)

(52) U.S. Cl.
CPC .............. *G06F 3/044* (2013.01); *G06F 3/0418* (2013.01)

(58) Field of Classification Search
CPC ................................ G06F 3/044; G06F 3/0418
USPC .................................................. 345/173–174
See application file for complete search history.

(56) References Cited

U.S. PATENT DOCUMENTS

| | | | | |
|---|---|---|---|---|
| 2010/0134422 A1* | 6/2010 | Borras | ..................... | G06F 3/044 345/173 |
| 2011/0148804 A1* | 6/2011 | Yeh | ........................ | G06F 3/0038 345/174 |
| 2013/0141368 A1* | 6/2013 | Wang | ...................... | G06F 3/044 345/173 |
| 2013/0271416 A1* | 10/2013 | Liu | ........................ | G06F 3/0412 345/173 |
| 2014/0009436 A1* | 1/2014 | Lai | .......................... | G06F 3/044 345/174 |

FOREIGN PATENT DOCUMENTS

TW          201214252 A        4/2012

OTHER PUBLICATIONS

Taiwan Intellectual Property Office, "Office Action", Dec. 29, 2014.

* cited by examiner

*Primary Examiner* — Temesgh Ghebretinsae
*Assistant Examiner* — Kwin Xie
(74) *Attorney, Agent, or Firm* — WPAT, P.C.; Justin King (57) ABSTRACT

A signal processing method for a touch panel is provided. The touch panel includes a first sensing region and a second sensing region. The first sensing region is monitored by at least one first sensor to generate a first monitoring result. The second sensing region is monitored by at least one second sensor to generate a second monitoring result. The signal processing method includes determining whether a touch point formed in the first sensing region is close to the second sensing region, and generating position information of the touch point according to the first monitoring result and the second monitoring result when the touch point is close to the second sensing region.

5 Claims, 14 Drawing Sheets

TOUCH CONTROL SYSTEM AND SIGNAL PROCESSING METHOD THEREOF

This application claims the benefit of Taiwan application Serial No. 102117396, filed May 16, 2013, the subject matter of which is incorporated herein by reference.

BACKGROUND OF THE INVENTION

1. Field of the Invention

The invention relates in general to a touch control system, and more particularly, to a touch control system having multiple sensing regions.

2. Description of the Related Art

Operating interfaces of recent electronic products have become increasingly user-friendly and intuitive with the progressing technology. For example, through a touch screen, a user can directly interact with applications as well as input messages/texts/patterns with fingers or a stylus, thus eliminating complexities associated with other input devices such as a keyboard or buttons. In practice, a touch screen usually comprises a touch panel and a display provided at the back of the touch panel. According to a touch position on the touch panel and a currently displayed image on the display, an electronic device determines an intention of the touch to execute corresponding operations.

Existing capacitive touch sensing techniques can be roughly categorized into self capacitive and mutual capacitive types. Compared to mutual-capacitive touch panels, self capacitive touch panels can be implemented through a single-layer electrode with a simpler manufacturing process and lower costs, and thus prevail in many entry-level electronic products.

Figure 1:
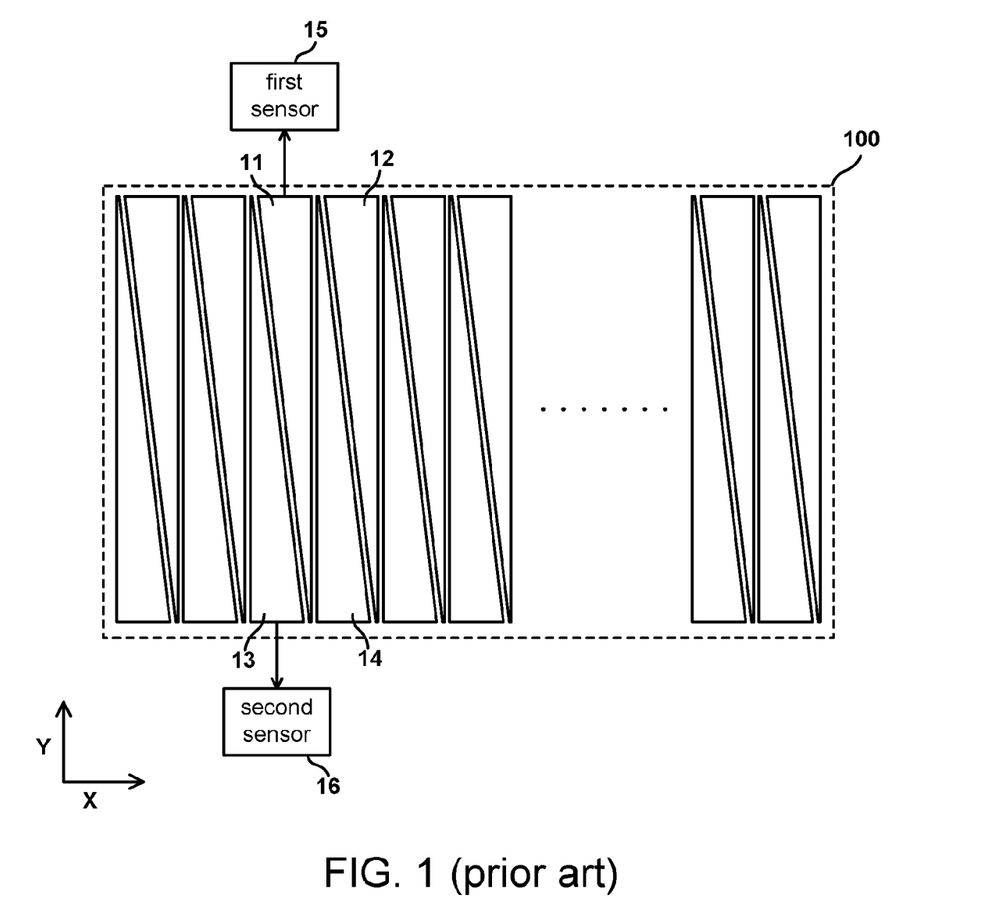
FIG. 1 and FIG. 2 are exemplary electrode arrangements of a conventional self capacitive touch panel.

FIG. 1 shows a common self capacitive touch panel. In a sensing region 100 represented by a dotted frame, a plurality of electrodes (e.g., electrodes 11, 12, 13 and 14) having equal widths and similar to right triangles are disposed. In this example, each of the electrode is connected to a sensor (to keep the diagram clear, only a first sensor 15 connected to the electrode 11 and a first sensor 16 connected to the electrode 13 are depicted as a representative). The sensors detect capacitance changes of the electrodes, and provide detection results to a controller (not shown), which then accordingly determines a position of a user touch. The controller may calculate coordinates (x, y) of the position of the user touch according to the equations below:

$$x = \frac{\sum_{i=1}^{N}(C_i * X_i)}{\sum_{i=1}^{N} C_i},$$

In the above equations, N represents a total number of the sensors, i is an integral index between 1 and N, $C_i$ represents a capacitance change detected by an $i^{th}$ sensor, $X_i$ represents an X-coordinate of a centroid of the electrode connected the $i^{th}$ sensor, and $Y_i$ represents a Y-coordinate of a centroid of the electrode connected the $i^{th}$ sensor.

Figure 2:
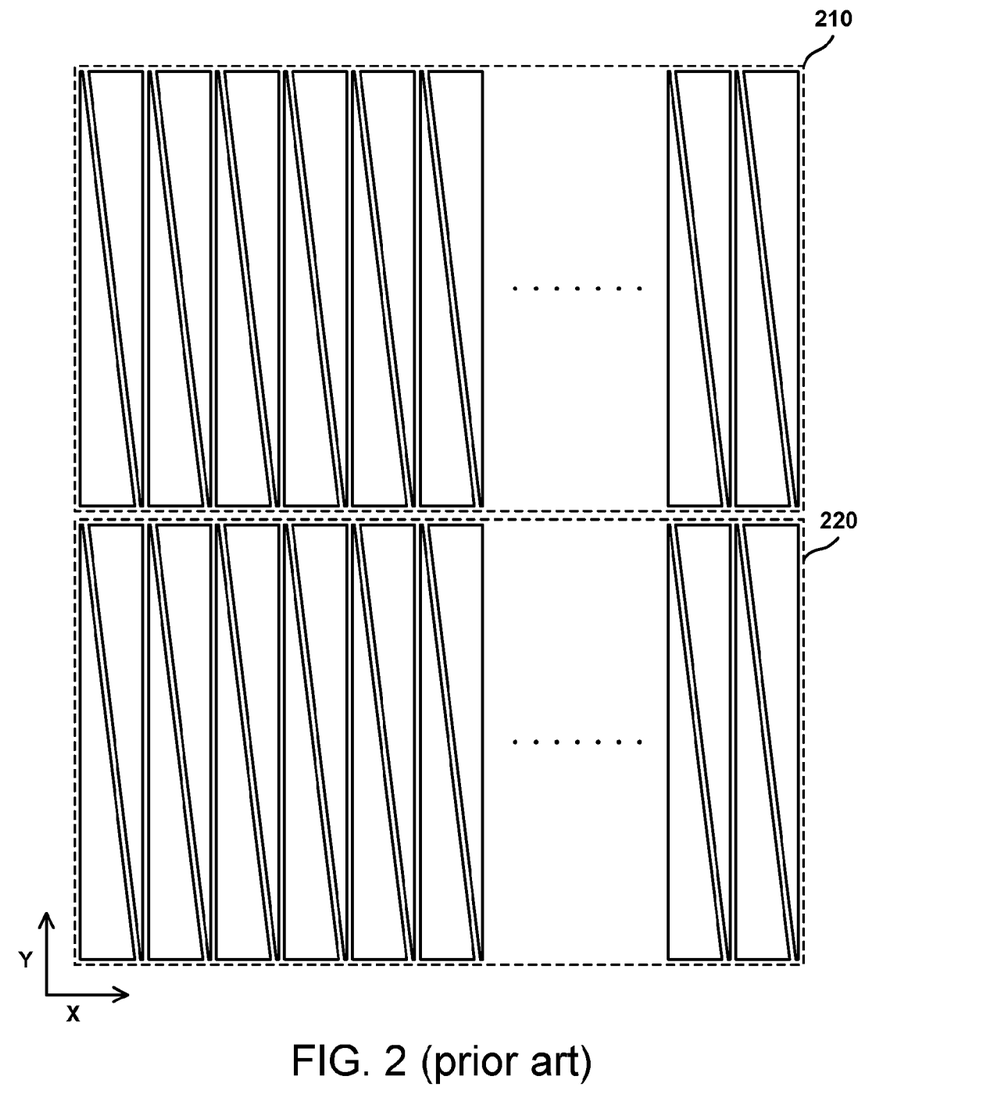
Figure 3A:
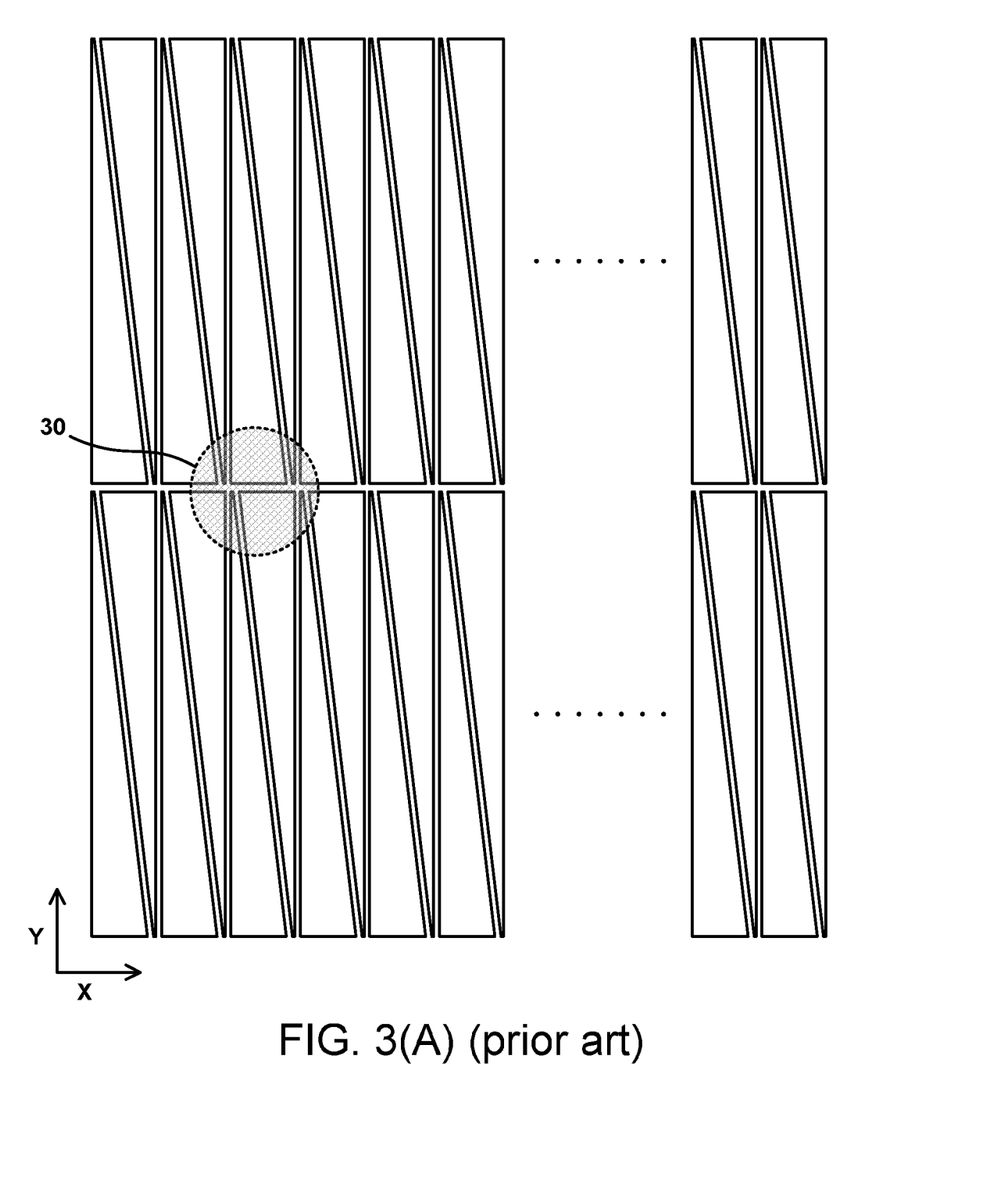
FIG. 3(A) and FIG. 3(B) illustrate possible misjudgment caused by a touch point occurring between two sensing regions.
Figure 3B:
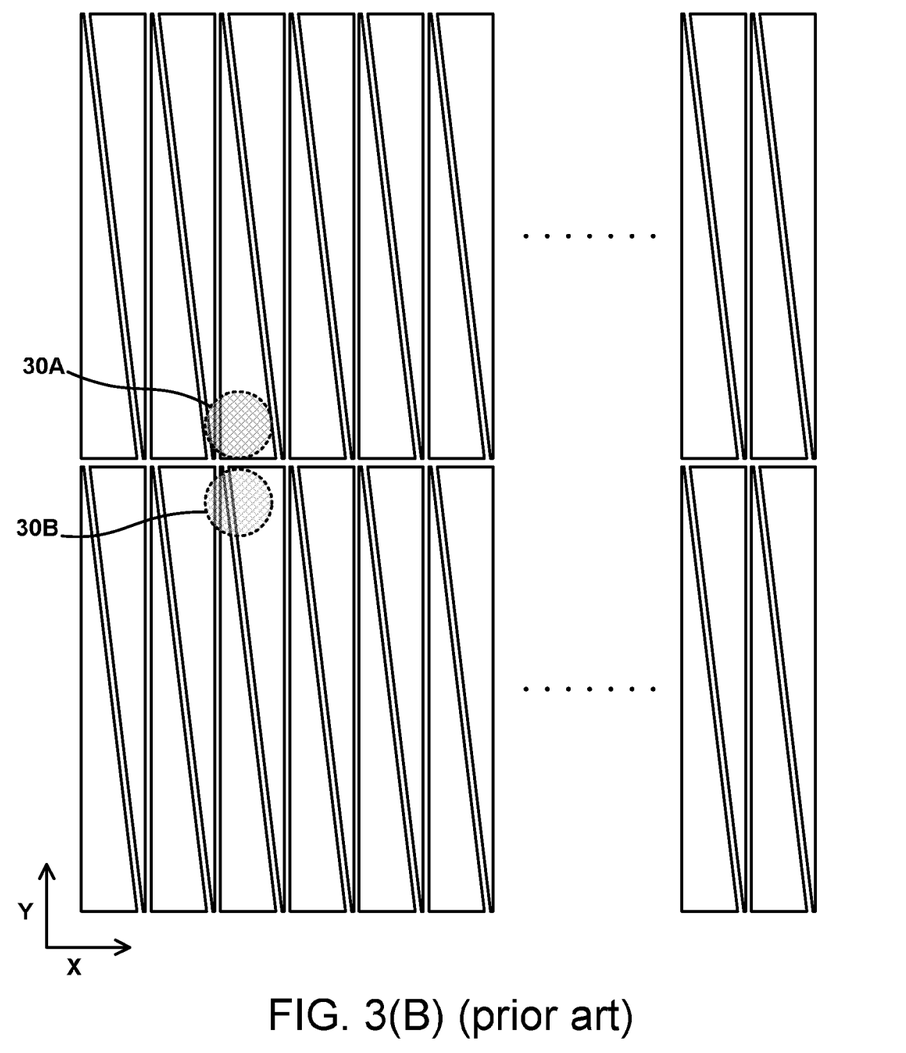

To expand a touch control area, an electrode arrangement forming multiple sensing regions shown in FIG. 2 is developed. As shown in FIG. 2, the electrodes are divided into upper and lower groups in the Y-direction to form two different sensing regions 210 and 220. In the prior art, a controller regards the sensing regions 210 and 220 as two independent regions, and considers capacitance changes in the two sensing regions individually. A setback of such approach is that, when a position of a user touch simultaneously covers both of the sensing region 210 and the sensing region 220, a misjudged result is likely incurred. For example, when the user touch falls at a position represented by a dotted circle in FIG. 3(A), the controller may interpret the touch point as two smaller touch points 30A and 30B depicted in FIG. 3(B). The above detection error at border regions of a sensing region may lead the controller to misjudge an intention of the user touch and thus trigger an erroneous operation result.

SUMMARY OF THE INVENTION

To solve the above issues, the invention is directed to a touch control system and signal processing method thereof. By appropriately and selectively considering monitoring results of multiple sensing regions, the touch control system and signal processing method thereof according to the present invention are capable of effectively reducing the possibility of misjudgment. In addition to a self capacitive touch panel, the concept of the present invention is also applicable to other types of touch control apparatuses having multiple sensing regions.

According to an embodiment the present invention, a signal processing method for a touch panel is provided. The touch panel includes a first sensing region and a second sensing region. The first sensing region is monitored by at least one first sensor to generate a first monitoring result. The second sensing region is monitored by at least one second sensor to generate a second monitoring result. The signal processing method includes determining whether a touch point formed in the first sensing region is close to the second sensing region, and generating position information of the touch point according to the first monitoring result and the second monitoring result when the touch point is close to the second sensing region.

According to another embodiment of the present invention, a touch control system is provided. The touch control system includes a first sensing region, a second sensing region, at least one first sensor, at least one second sensor, and a control module. The at least one first sensor monitors the first sensing region to generate a first monitoring result. The at least one second sensor monitors the second sensing region to generate a second monitoring result. The control module determines whether a touch point formed in the first sensing region is close to the second sensing region, and generates position information of the touch point according to the first monitoring result and the second monitoring result when the touch point is close to the second sensing region.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 4A:
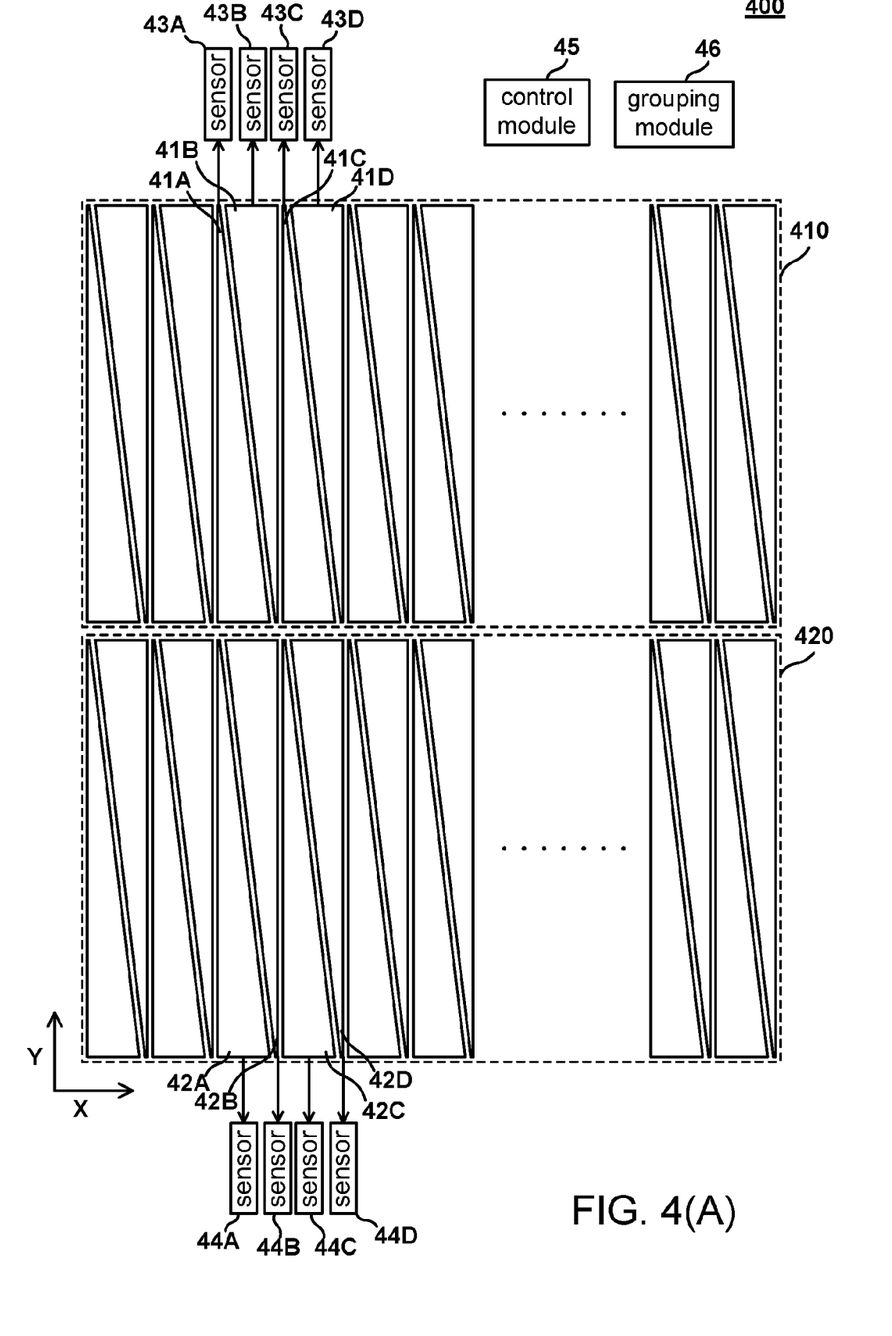
FIG. 4(A) is an electrode arrangement and a function block diagram of a self capacitive touch panel according to an embodiment of the present invention.

FIG. 4(A) shows an electrode arrangement of a self capacitive touch system according to an embodiment of the present invention. Multiple electrodes having planar contours similar to right triangles are divided into upper and lower groups in the Y-direction to form two different sensing regions 410 and 420. In the embodiment, each of the electrodes is connected to a sensor that detects a capacitance change. In other words, the sensing regions 410 and 420 are monitored by multiple sensors. To maintain a clear diagram, only sensors 43A to 43D and 44A to 44D connected to electrodes 41A to 41D and electrodes 42A to 42D are depicted in FIG. 4(A).

Monitoring results generated by the sensors are transmitted to a control module 45, which accordingly determines a position of a user touch. When a touch point is formed in the first sensing region 410, the control module 45 first determines whether the touch point is close to the second sensing region 420. When the control module 45 determines that the touch point is close to the second sensing region 420, the control module 45 at the same time considers the monitoring results generated by the sensors of the first region 410 and the monitoring results generated by the sensors of the second region 420 to determine position information of the touch point. In contrast, when the control module 45 determines that the touch point is not close to the second sensing region 420, the control module 45 determines the position information of the touch point according to the monitoring results generated by the sensors of the first sensing region 410.

Figure 4B:
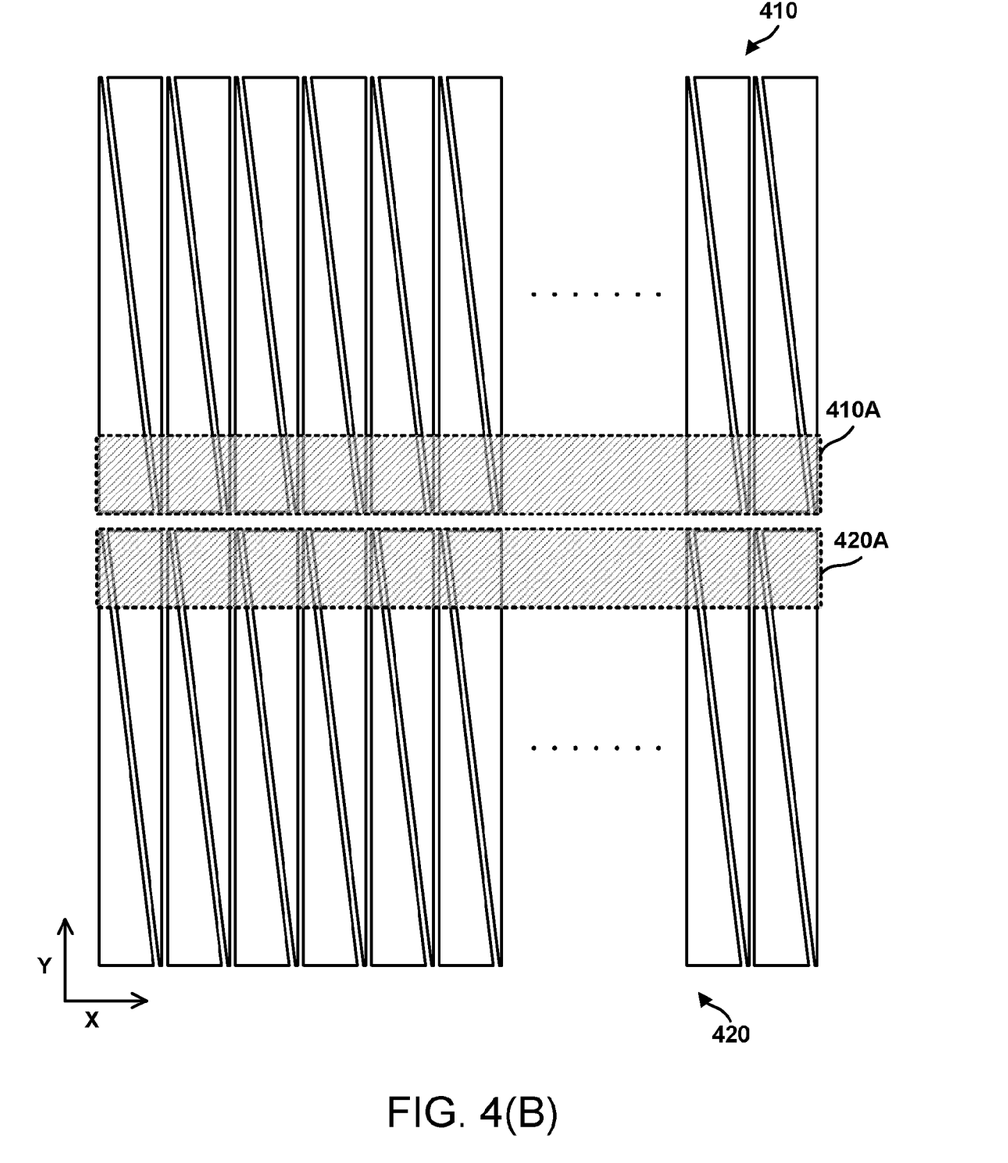
FIG. 4(B) is an example of border ranges according to an embodiment of the present invention.

FIG. 4(B) shows how the control module 45 determines whether the touch point is close to the second sensing region 420 according to an embodiment. As shown in FIG. 4(B), an area deemed close to the second sensing region 420 in the first sensing region 410 may be pre-defined as a virtual border range 410A, and an area deemed close to the first sensing region 410 in the second sensing region 420 may be pre-defined as a virtual border range 420A. For example, the control module 45 may preliminarily determine whether a touch point falling in the first sensing region 410 is present according to the monitoring results generated by the sensors of the first region 410, and then calculate a set of preliminary coordinates for the touch point. When the preliminary coordinates fall within the virtual border range 410A, the control module 45 determines that the touch point is close to the second sensing region 420. Similarly, when the preliminary coordinates of the touch point fall within the virtual border range 420A, the control module 45 determines that the touch point is close to the first sensing region 410.

The concept of the present invention is applicable to single-touch control as well as multi-touch control. In the description below, a situation where a touch control system 400 is applied to single-touch/double-touch control is given as an example. In an embodiment where multi-touch control is supported, the self capacitive touch system 400 may include a grouping module 46 that groups the monitoring results. In one embodiment, the grouping module 46 groups sensing changes generated by the sensors of the first sensing region 410 to generate a first grouping result, and groups sensing changes generated by the sensors of the second sensing region 420 to generate a second grouping result. In practice, a grouping method of the grouping module 46 may be grouping sensing changes corresponding to electrodes that are located at close positions into a same group. FIG. 5(A) to FIG. 5(E) show several possible types of touch points to illustrate corresponding operations according to an embodiment of the present invention.

Figure 5A:
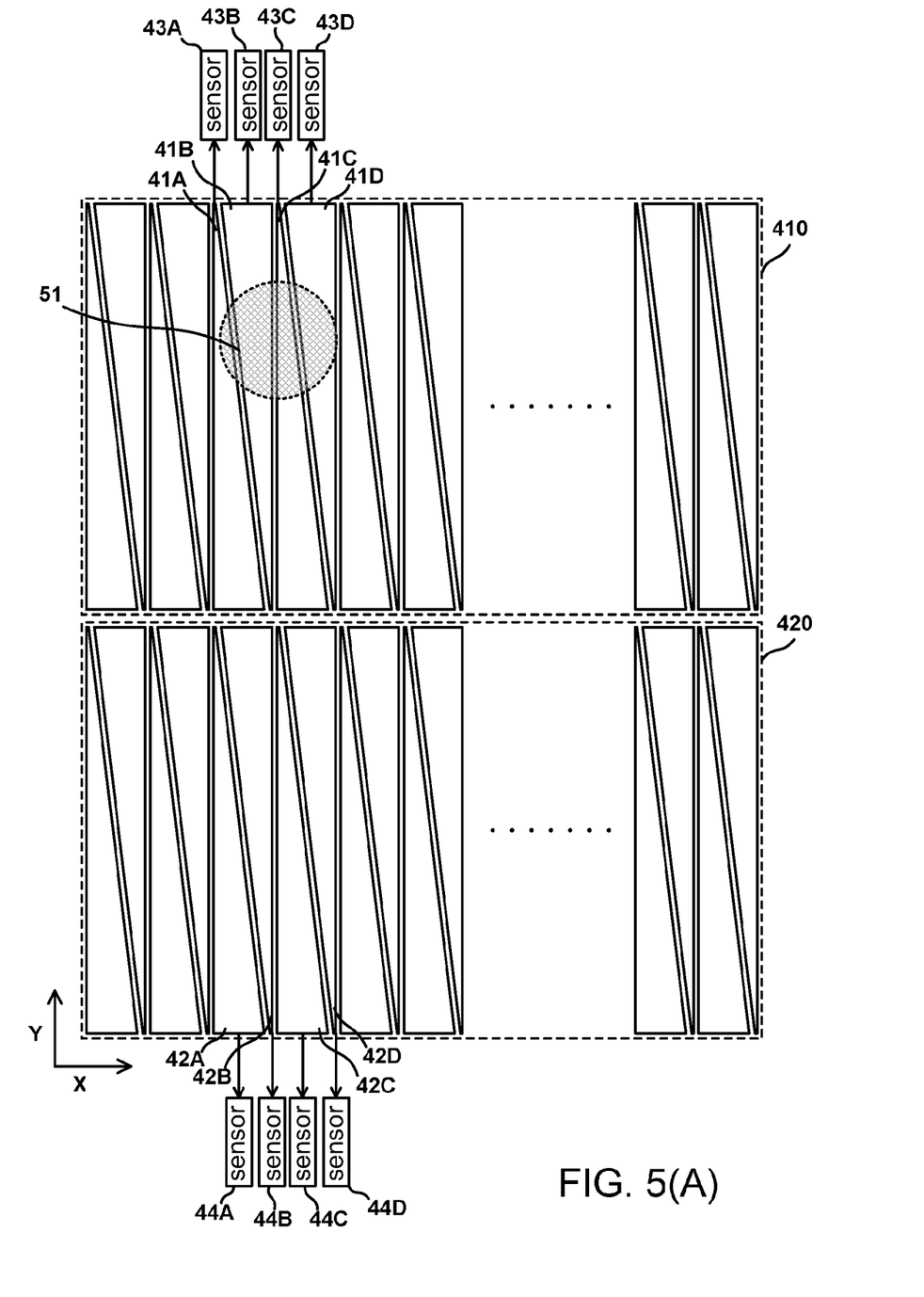
FIG. 5(A) to FIG. 5(E) are several possible types of touch points.

Assume that a user touch occurs at a position represented by a dotted circle 51 in FIG. 5(A), and the affected electrodes are the electrodes 41A to 41D. The monitoring results outputted by the sensors 43A to 43D are correspondingly changed. As physical positions of the electrodes 41A to 41D are close, the grouping module 46 may regard the sensing changes obtained by the sensors 43A to 43D as a sensing change group. In contrast, no sensing change group occurs in the second sensing region 420. As such, the control module 45 determines that the first sensing change group forms a touch point in the first sensing region 410. According to the monitoring results of the sensors 43A to 43D, the control module 45 conjectures that the touch point does not fall within the virtual border range 410A. Thus, the control module 45 directly determines the position information of the touch point according to the monitoring results of the sensors 43A to 43D.

Figure 5B:
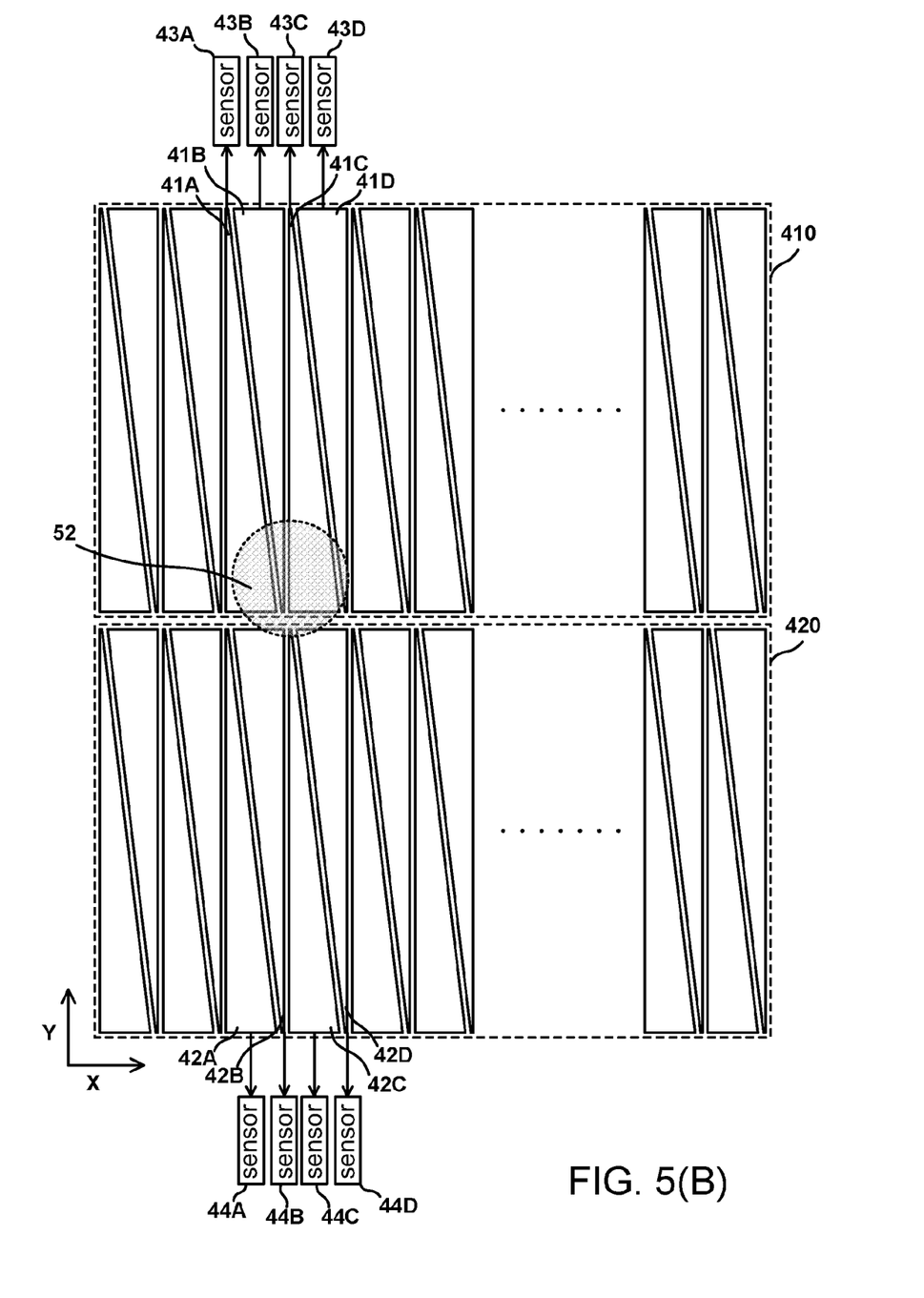

Assume that the user touch occurs at a position represented by a dotted circle 52 in FIG. 5(B), and the affected electrodes are the electrodes 41A to 41D. However, the sensing amounts corresponding to the electrodes 42B to 42D are also slightly changed. If the sensing changes outputted by the sensors 44B to 44D are too weak to form a group, the grouping module 46 may indicate that a first sensing change group occurs in the first sensing region 410, whereas no sensing change group occurs in the second sensing region 420. The control module 45 may conjecture that the touch point formed by the first sensing change group falls within the virtual border range 410A. As seen from FIG. 5(B), the electrodes 41A to 41D located in the first sensing region 410 and the electrodes 42A to 42D in the second sensing region 420 have approximate X-coordinates. When the above monitoring results arise, in addition to the monitoring results of the sensors 43A to 43D, the control module 45 may further consider the monitoring results of the sensors 44A to 44D to establish a reference for a final decision on the position information of the touch point. As the sensing changes outputted by the sensors 44B to 44D are also considered, the accuracy of the position information generated by the control module 45 can be enhanced.

Figure 5C:
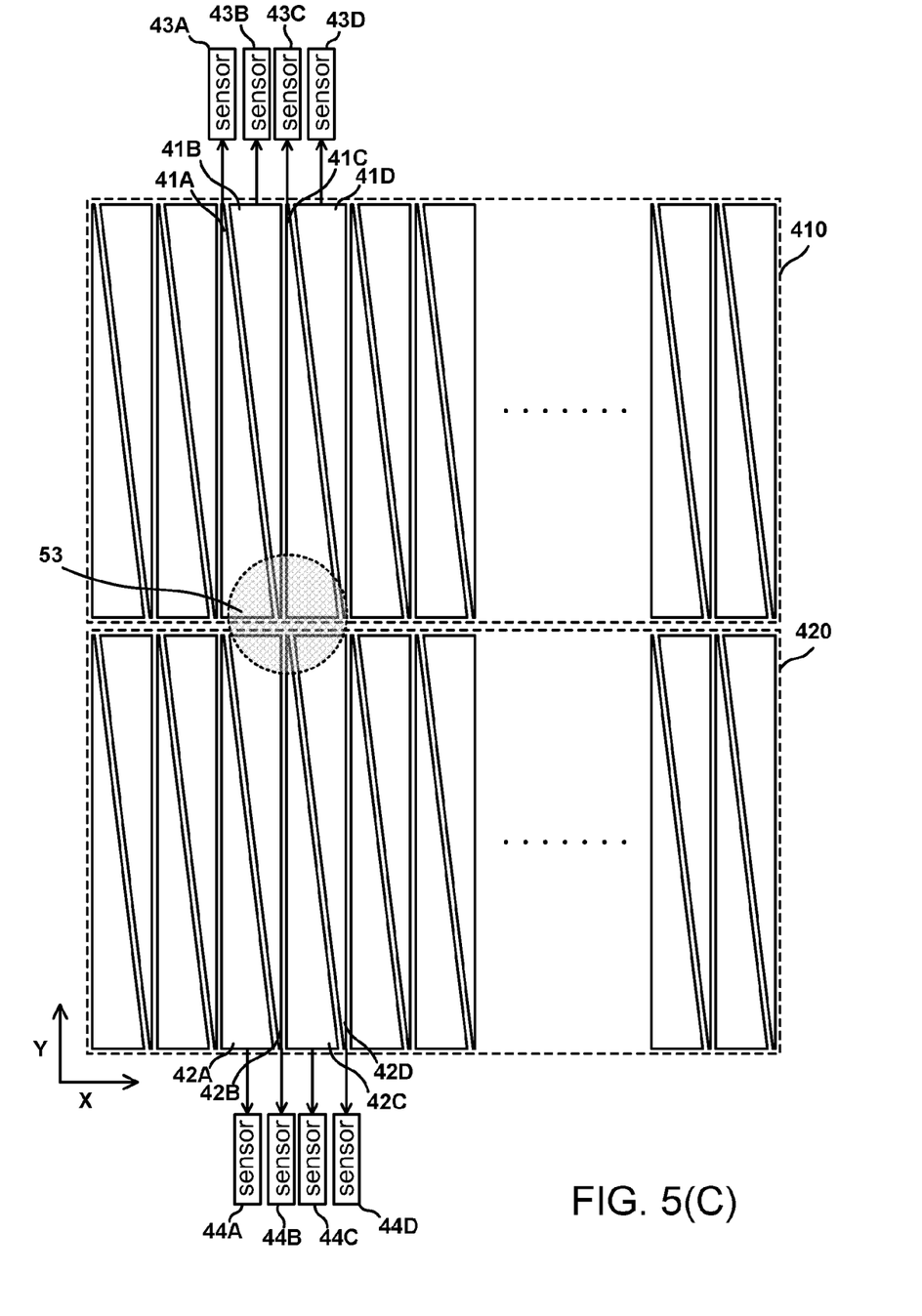

Assume that the user touch occurs at a position represented by a dotted circle 53 in FIG. 5(C), and the electrodes with affected capacitance changes are the electrodes 41A to 41D and the electrodes 42B to 42D. The monitoring results of the sensors 43A to 43D and 44B to 44D are correspondingly changed. Under such conditions, the grouping results indicate that a first sensing change group (contributed by the monitoring results of the sensors 43A to 43D) occurs in the first sensing region 410, and a second sensing change group (contributed by the monitoring results of the sensors 44B to 44D) occurs in the second sensing region 420. In the embodiment, the control module 45 first determines a distance between the first sensing change group and the second sensing change group. When the distance is smaller than a threshold (which may be determined by a hardware designer), it means that the two sensing change groups are much likely included in a touch point that extends across the first sensing region 410 and the second sensing region 420. Thus, the control module 45 regards two sensing change groups having a distance in between smaller than the threshold as an intermediate touch point, and simultaneously considers the monitoring results of the sensors 43A to 43D and 44B to 44D to generate the position information corresponding to the intermediate touch point.

Figure 5D:
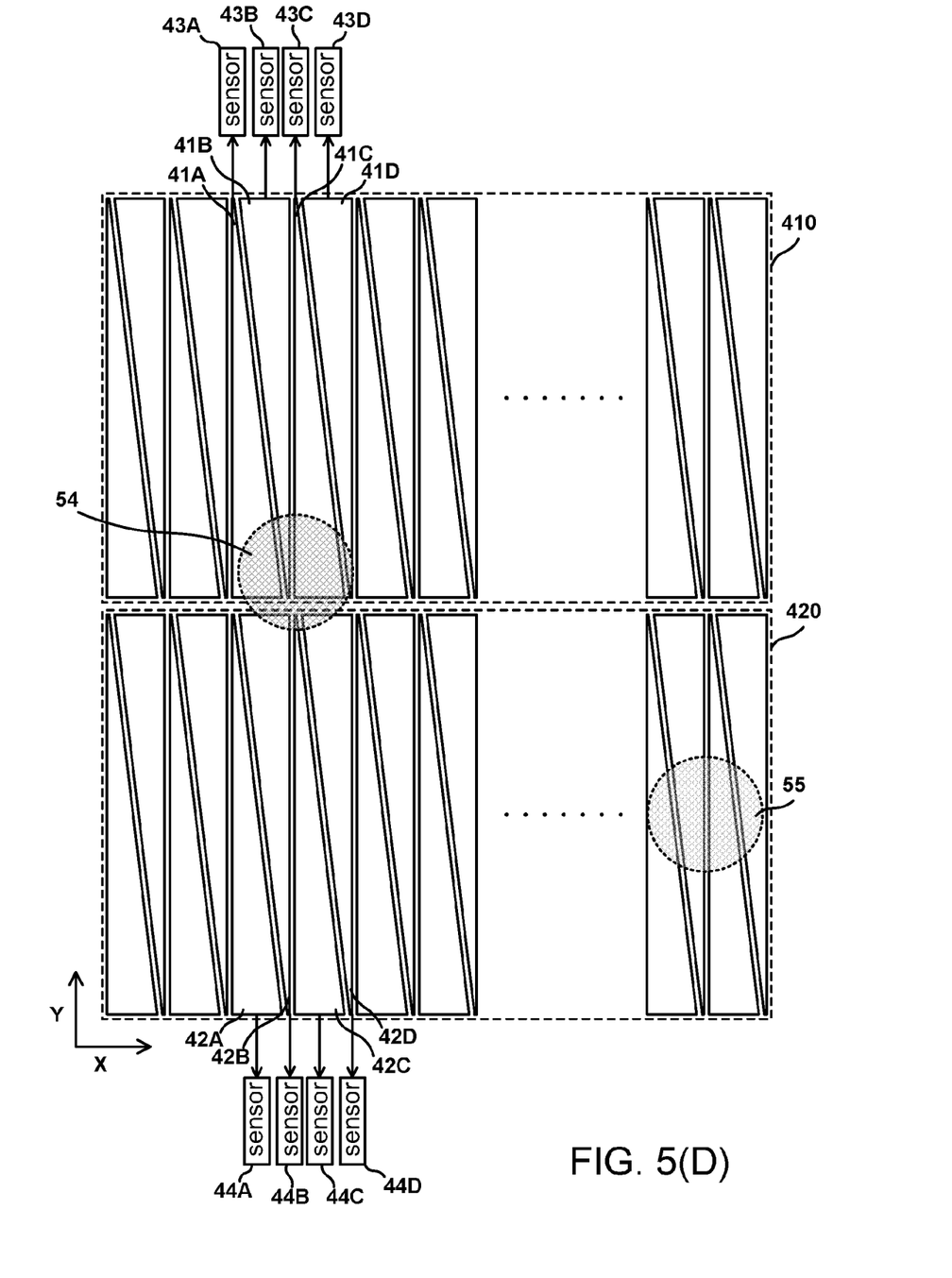

Conversely, when the control module 45 determines that the distance between the first touch point and the second touch point is greater than the threshold, e.g., touch points 54 and 55 in FIG. 5(D), the control module 45 regards the two sensing change groups as two different touch points, and determines respective position information of the two touch points. For the first touch point 54 that largely covers the first sensing region 410 and slightly covers the second sensing region 420, since the first touch point 45 falls within the virtual border range 410, the control module 45 determines the position information of the first touch point 54 according to not only the monitoring results of the sensors of the corresponding sensing region. As seen from FIG. 5(C), the sensors 43A to 43D in the first sensing region 410 and the sensors 44A to 44D in the second sensing region 420 have approximate X-coordinates. Thus, in addition to the sensors 43A to 43D, the control module 45 further considers the monitoring results of the sensors 44A to 44D to establish a reference for a final decision on the position information of the first touch point 54.

On the other hand, for the second touch point 55 that is completely distributed in the second sensing region 420 and does not at all fall in the virtual border range 420A, the control module 43 may determine the position information of the second touch point 55 according to only the monitoring results generated by the sensors of the second sensing region 420. That is to say, the control module 45 determines the position information of the second touch point 55 without considering the monitoring results generated by the sensors of the first sensing region 410.

Figure 5E:
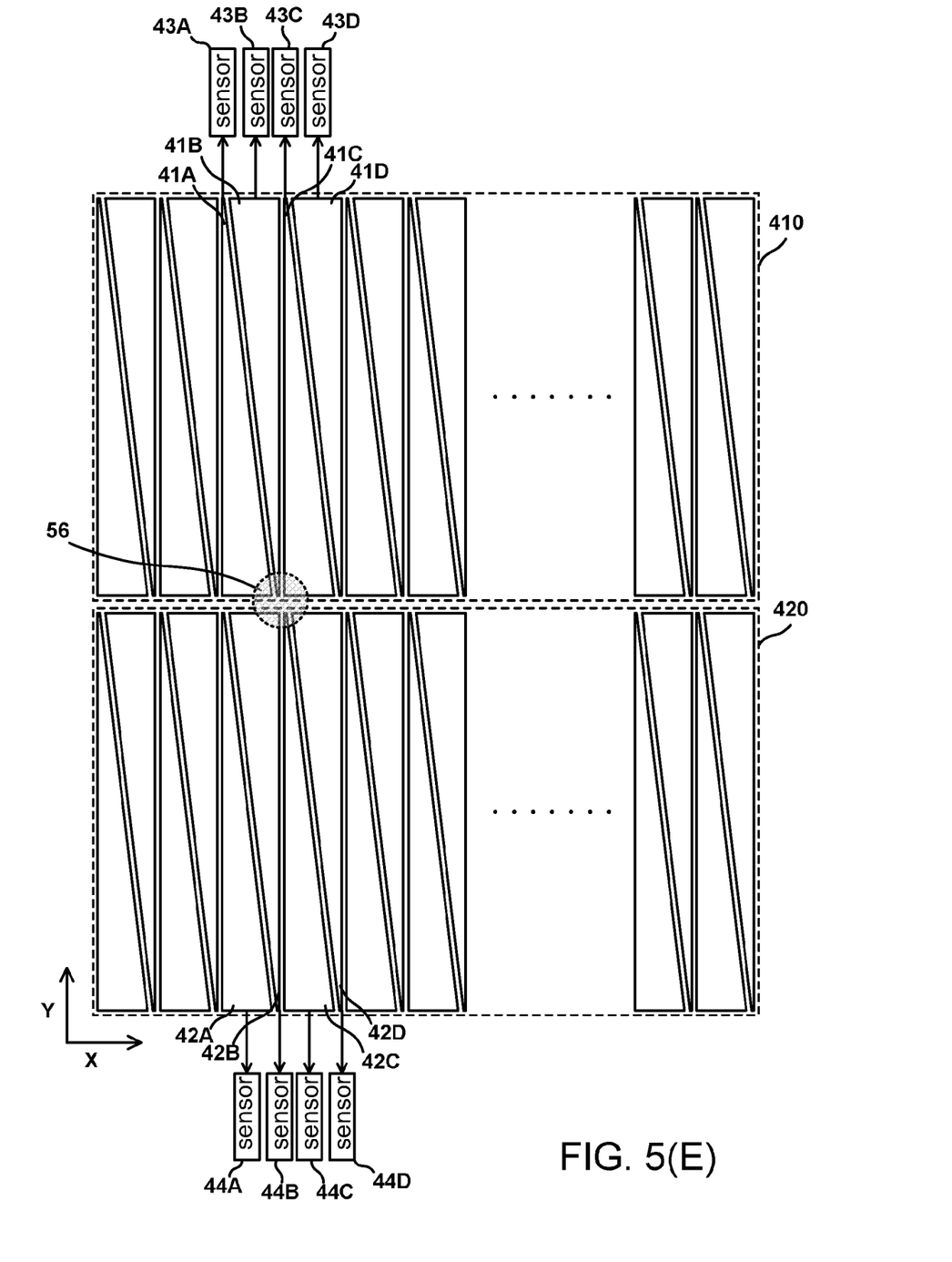

In an alternative embodiment, assume that the user touch occurs at a position represented by a dotted circle 56 in FIG. 5(E). Since the monitoring results generated by the sensors that monitor the first sensing region 410 and the second sensing region 420 are quite weak (only minute capacitance changes are detected), the grouping results may indicate that no sensing change group occurs in the first sensing region 410 or the second sensing region 420. Under such conditions, the control module 45 re-examines all the monitoring results to again determine whether a touch point exists in either of the first sensing region 410 and the second sensing region 420. For example, the control module 45 may regard the electrodes 41A, 41B, 42A and 42B having approximate X-coordinates as a large electrode, and sum up the capacitance changes contributed by the four small electrodes. Similarly, the capacitance changes contributed by the electrodes 41C, 41D, 42C and 42D having approximate X-coordinates may be summed up. As such, it is made more possible for the control module 45 to determine the existence of the touch point according to the summed up monitoring results having higher values.

Figure 6:
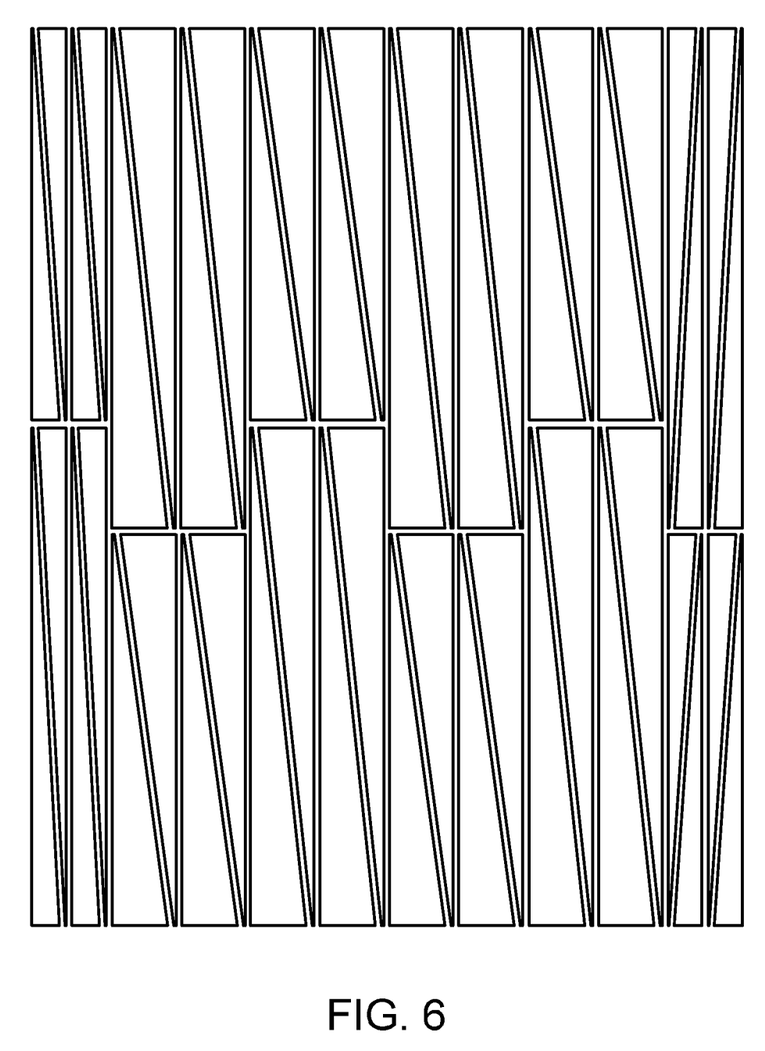
FIG. 6 is a schematic diagram of an electrode arrangement according to another embodiment of the present invention.

In the above embodiments, the electrode arrangements in the upper and lower sensing regions are the same. It should be noted that such arrangements are given as examples for explaining the present invention, not limiting the present invention. The shapes of the electrodes in the sensing regions are not limited to the right triangles as in the foregoing embodiments. For example, the shapes of the electrodes may be rectangles, rhombuses, parallelograms or other polygons. Further, one person skilled in the art can easily understand that, instead of being limited to specific values, the size, shape and covered area of the border range may be determined according to experimental results or the rule of thumb by hardware designers. Further, an adjacent border between two sensing regions is not limited to a straight line. For example, the concept of the present invention is also applicable to the electrode arrangement shown in FIG. 6, i.e., to a situation where not all electrodes are equal in width and length.

Figure 7:
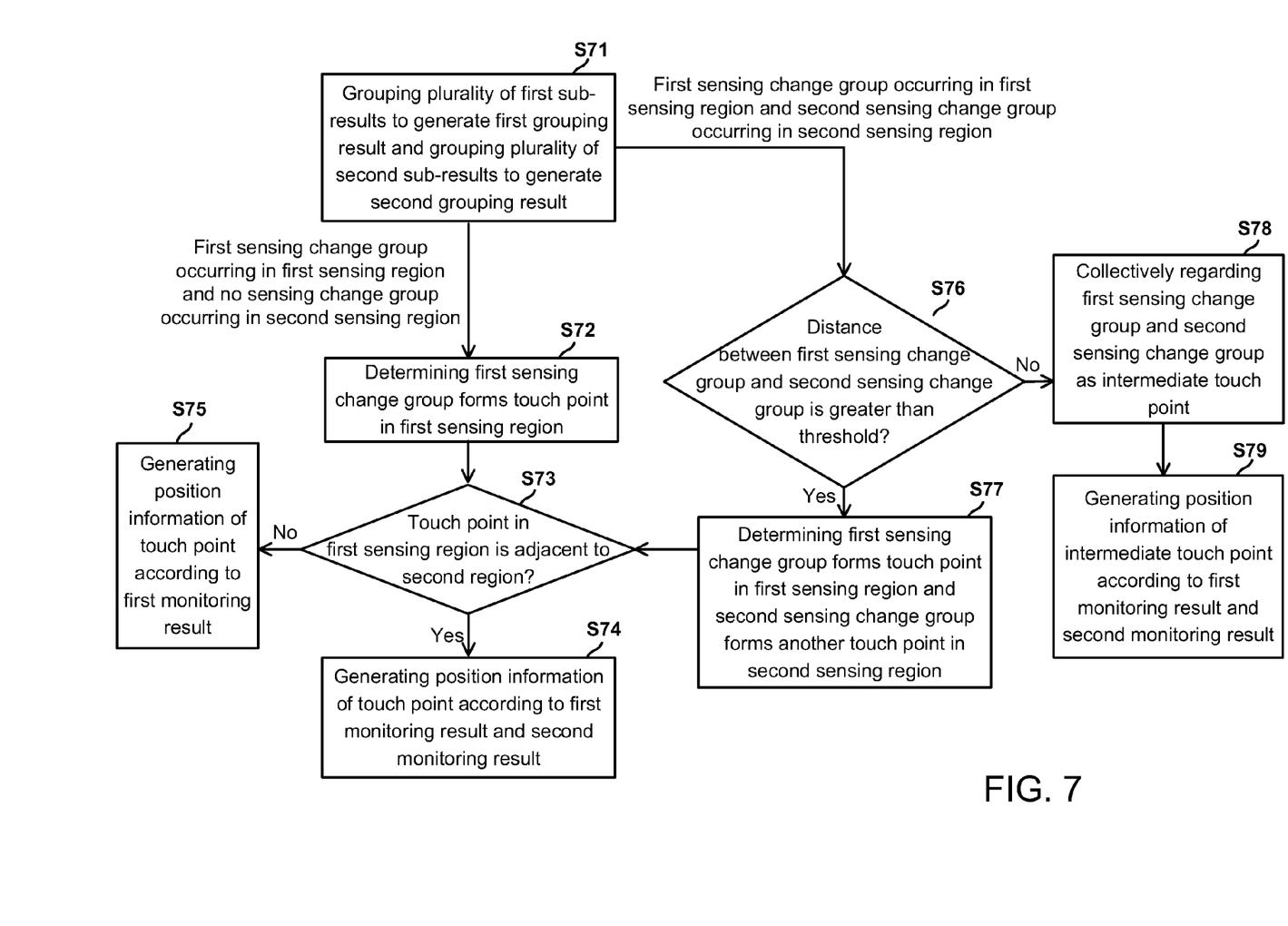
FIG. 7 is a flowchart of a signal processing method according to an embodiment of the present invention.

A signal processing method for a touch panel is further provided according to another embodiment of the present invention. FIG. 7 shows a flowchart of the signal processing method. The touch panel includes a first sensing region and a second sensing region. The first sensing region is monitored by at least one first sensor to generate a first monitoring result including a plurality of first sub-results. The second sensing region is monitored by at least one second sensor to generate a second monitoring result including a plurality of second sub-results. Referring to FIG. 7, in step S71, the first sub-results are grouped to generate a first grouping result, and the second sub-results are grouped to generate a second grouping result. When the first grouping result indicates that a first sensing change group occurs in the first sensing region and the second grouping result indicates that no sensing change group occurs in the second sensing region, step S72 is performed. In step S72, it is determined that the first sensing change group forms a touch point in the first sensing region. In step S73, it is determined whether the touch point is close to the second sensing region. When a determination result of step S73 is affirmative, as shown in step S74, position information of the touch point is generated according to the first monitoring result and the second monitoring result. Conversely, when the determination result of step S73 is negative, as shown in step S75, the position information of the touch point is determined according to only the first monitoring result.

After step S71, when the first grouping result indicates that the first sensing change group occurs in the first sensing region and the second grouping result indicates that a second sensing change group occurs in the second sensing region, step S76 is performed. In step S76, it is determined whether a distance between the first sensing change group and the second sensing change group is greater than a threshold. When a determination result of step S76 is negative, step S78 and step S79 are performed. In step S78, the first sensing change group and the second sensing change group are collectively regarded as an intermediate touch point. In step S79, position information of the intermediate touch point is generated according to the first monitoring result and the second monitoring result. Conversely, when the determination result of step S76 is affirmative, step S77 is performed. In step S77, it is determined that the first sensing change group forms the touch point in the first sensing region, and the second sensing change group forms another touch point in the second sensing region. The process proceeds to step S73 to determine whether the first touch point is close to the second sensing region.

One person skilled in the art can fully appreciate that the operations and variations (e.g., the grouping methods and the approaches for processing multiple touch points in the description associated with the self capacitive touch system 400) are applicable to the signal processing method in FIG. 7, and shall be omitted herein.

Figure 8:
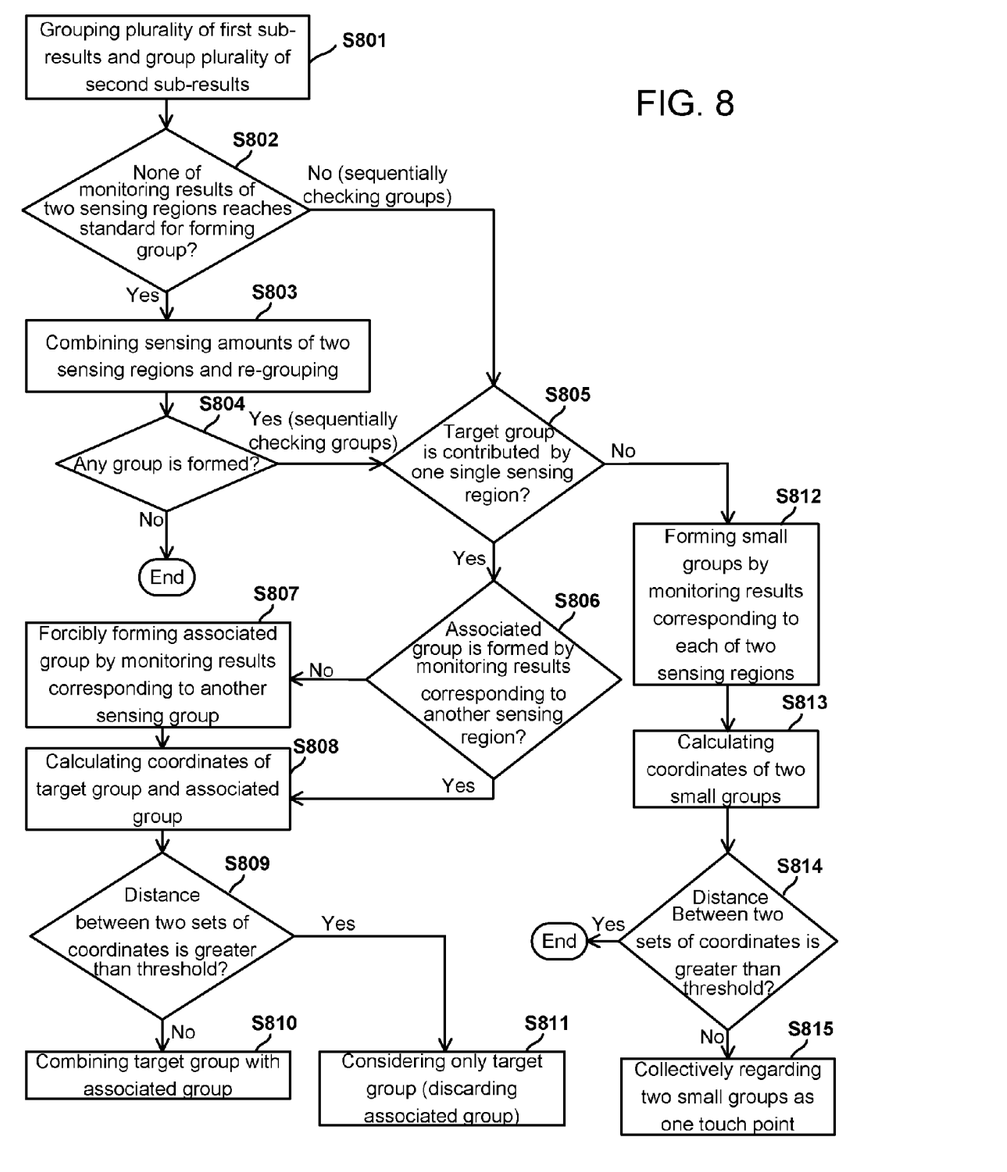
FIG. 8 is a flowchart of a signal processing method according to another embodiment of the present invention.

A signal processing method for a touch panel is further provided according to another embodiment of the present invention. FIG. 8 shows a flowchart of the signal processing method. The touch panel includes a first sensing region and a second sensing region. The first sensing region is monitored by at least one first sensor to generate a first monitoring result including a plurality of first sub-results. The second sensing region is monitored by at least one second sensor to generate a second monitoring result including a plurality of second sub-results. Referring to FIG. 8, in step S801, the first sub-results are grouped and the second sub-results are grouped. In step S802, it is determined whether the monitoring results corresponding to the sensing regions fail to reach a standard of forming a group. When a determination result of step S802 is affirmative, in step S803, the first sub-results and the second sub-results are combined and then re-grouped. For example, the electrodes 41A, 41B, 42A and 42B having similar X-coordinates may be regarded as a large electrode, and a combined monitoring result is a sum of the monitoring results corresponding to the four electrodes. Similarly, the monitoring results corresponding to the electrodes 41C, 41D, 42C and 42D having approximate X-coordinates may also be combined. In step S804, it is determined whether the combined and re-grouped monitoring results form any group. When a determination result of step S804 is affirmative, the process of the signal processing method ends.

When the determination result of step S802 is negative, or the determination result of step S804 is affirmative, step S805 and subsequent steps are applied to the groups. A group currently being applied with step S805 is referred to as a target group. In step S805, it is determined whether the target group is contributed and formed by monitoring results corresponding to one single sensing region. When a determination result of step S805 is affirmative, step S806 is performed to determine whether another group is formed by the monitoring results corresponding to another sensing region. For example, when the target group is formed by the sensing results of the sensors 43A to 43D, in step S806, it is determined whether the sensing results of the sensors 44A to 44D having approximate X-coordinates as the sensors 43A to 43D reach a condition of forming another group (to be referred to as an associated group).

When a determination result of step S806 is negative, step S807 is performed to forcibly form an associated group (may include one or multiple minute sensing changes) by the monitoring results corresponding to another sensing region. In step S808, coordinates of the target group and the associated group are calculated, respectively. Step S808 is performed when the determination result of step S806 is affirmative. In step S809, it is determined whether a distance between the two sets of coordinates is greater than a threshold. Step S810 is performed when a determination result of step S809 is negative. In step S810, the target group and the associated group are regarded as being included in a same touch point, and the monitoring results covered by the target group and the associated group are collectively considered to calculate the position information of the touch point. When the determination result of step S809 is affirmative, step S811 is performed. In step S811, the associated group is discarded. That is, the target group is considered as one touch point, and the position information of the touch point is calculated according to only the monitoring results covered by the target group.

Only when the determination results of step S802 and S804 are both affirmative, the determination result of step S805 is negative. When the determination result of step S805 is negative, step S812 is performed to render the monitoring results associated with the target group to form small groups in different sensing regions, respectively. In step S813, the coordinates of the two small groups are calculated. In step S814, it is determined whether the distance between the two sets of coordinates is greater than a threshold. Step S815 is performed when a determination result of step S814 is negative. In step S815, the two small groups are regarded as being included in a same touch point, and the monitoring results covered by the two small groups are collectively considered to calculate the position information of the touch point. Similarly, when the determination result of step S814 is affirmative, it means that the two small groups do not form any touch point either when independently present or combined. Thus, the process of the signal processing method ends.

One person skilled in the art can understand that, when the determination results of step S809 and step S814 are respectively negative, it is in equivalence to a situation where a touch point in a sensing region is close to another sensing region as described in the foregoing embodiments. In such conditions, the monitoring results of the two sensing regions are simultaneously considered to generate the position information of the touch point.

A touch control system and signal processing method thereof are disclosed by the present invention as above. By appropriately and selectively considering monitoring results of multiple sensing regions, the touch control system and signal processing method thereof according to the present invention are capable of effectively reducing the possibility of misjudgment. In addition to a self capacitive touch panel, the concept of the present invention is also applicable to other types of touch control apparatuses having multiple sensing regions.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A signal processing method for a touch panel, the touch panel comprising a first sensing region and a second sensing region, the first sensing region being monitored by at least one sensor to generate a first monitoring result, the second sensing region being monitored by at least one sensor to generate a second monitoring result, wherein the first monitoring result comprising a plurality of first sub-results and the second monitoring result comprising a plurality of second sub-result, the signal processing method comprising:
    grouping the first sub-results to generate a first grouping result;
    grouping the second sub-results to generate a second grouping result;
    determining that the first sensing change group forms the touch point in the first sensing region when the first group result indicates that a first sensing change group occurs in the first sensing region and the second grouping result indicates that no sensing change group occurs in the second sensing region;
    determining a distance between the first sensing change group and the second sensing change group when the first group indicates that the first sensing change group occurs in the first sensing region and the second grouping result indicates that a second sensing change group occurs in the second sensing region;
    determining that the first sensing change group forms the touch point in the first sensing region and the second sensing change group forms another touch point in the second sensing region when the distance is greater than a threshold;
    collectively regarding the first sensing change group and the second sensing change group as an intermediate touch point, and generating position information of the intermediate touch point according to the first monitoring result and the second monitoring result when the distance is smaller than the threshold; and performing step (a) and step (b) for the touch point:
- a) determining whether a touch point formed in the first sensing region is close to the second region; and
- b) generating position information of the touch point according to the first monitoring result and the second monitoring result when a determination result of step (a) is affirmative.

2. The signal processing method according to claim 1, further comprising:
when the determination result of step (a) is negative, generating the position information according to the first monitoring result.

3. The signal processing method according to claim 1, wherein the first sensing region comprises a pre-defined border range deemed close to the second sensing region, and step (b) determines whether the touch point is close to the second sensing region by determining whether the touch point falls within the border range.

4. A touch control system, comprising:
- a first sensing region;
- a second sensing region;
- at least one first sensor, configured to monitor the first sensing region to generate a first monitoring result, wherein the first monitoring result comprises a plurality of first sub-results;
- at least one second sensor, configured to monitor the second sensing region to generate a second monitoring result, wherein the second monitoring result comprises a plurality of second sub-results;
- a control module, configured to determine whether a touch point formed in the first sensing region is close to the second sensing region, and to generate position information of the touch point according to the first monitoring result and the second monitoring result when the touch point is close to the second sensing region, wherein the control module generates the position information according to the first monitoring result when the touch point is not close to the second region; and
- a grouping module, configured to group the first sub-results to generate a first grouping result and to group the second sub-results to generate a second grouping result;

wherein, when the first group result indicates that a first sensing change group occurs in the first sensing region and the second grouping result indicates that no sensing change group occurs in the second sensing region, the control module determines that the first sensing change group forms the touch point in the first sensing region; and wherein when the first group result indicates that the first sensing change group occurs in the first sensing region and the second grouping result indicates that a second sensing change group occurs in the second sensing region, the control module determines a distance between the first sensing change group and the second sensing change group, when the distance is greater than a threshold the control module determines that the first sensing change group forms the touch point in the first sensing region and the second sensing change group forms another touch point in the second sensing region, and when the distance is smaller than the threshold, the control module collectively regards the first sensing change group and the second sensing change group as an intermediate touch point, and generates position information of the intermediate touch point according to the first monitoring result and the second monitoring result.

5. The touch control system according to claim 4, wherein the first sensing region comprises a pre-defined border range deemed close to the second sensing region, and the control module determines whether the touch point is close to the second sensing region by determining whether the touch point falls within the border range.

* * * * *